United States Patent [19]

Bottamiller et al.

[11] Patent Number: 4,644,655

[45] Date of Patent: Feb. 24, 1987

[54] CUTTING HEAD FOR LAWN TRIMMER

[76] Inventors: Douglas O. Bottamiller; George Spector, both of 233 Broadway RM 3615, New York, N.Y. 10007

[21] Appl. No.: 781,699

[22] Filed: Sep. 30, 1985

[51] Int. Cl.⁴ .............................................. A01D 50/00
[52] U.S. Cl. ....................................... 30/347; 56/12.7
[58] Field of Search .................. 30/347, 276, 500; 56/12.7

[56] References Cited

U.S. PATENT DOCUMENTS

| 3,831,278 | 8/1974 | Voglesonger | 30/347 |
| 4,054,992 | 10/1977 | Ballas | 30/276 |
| 4,062,114 | 12/1977 | Luick | 30/276 |
| 4,068,377 | 1/1978 | Kimmel | 30/500 |
| 4,118,865 | 10/1978 | Jacyno | 30/276 |
| 4,137,694 | 2/1979 | Hopper | 56/12.7 |

Primary Examiner—Jimmy C. Peters

[57] ABSTRACT

A cutting head for a lawn trimmer is provided and consists of a cylindrical housing block bolted to a lower portion of the lawn trimmer so that the housing block is rotatably mounted thereto. A flexible cord with a knot at center of the cord is placed within an opening of the housing block with ends of the cord extending outwardly through each of a pair of opposed holes at side of the housing block. When the lawn trimmer is turned on the knot will retain the cord within the block. In another form a sleeve is mounted securely on the cord to retain the cord in the block.

2 Claims, 8 Drawing Figures

U.S. Patent  Feb. 24, 1987  4,644,655
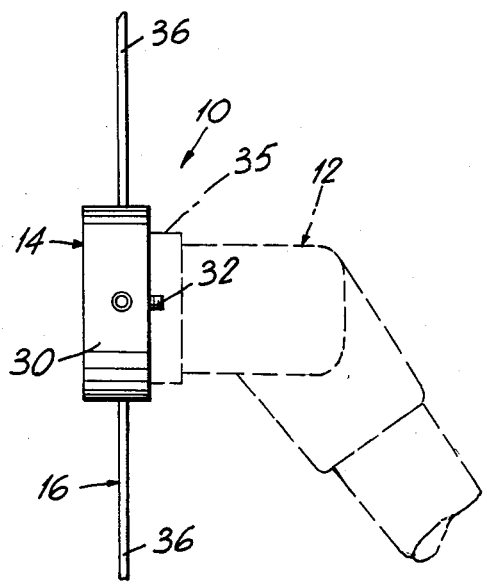
FIG. 1
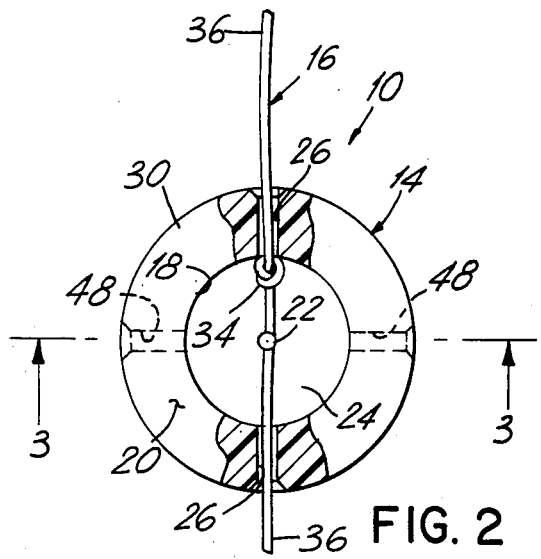
FIG. 2
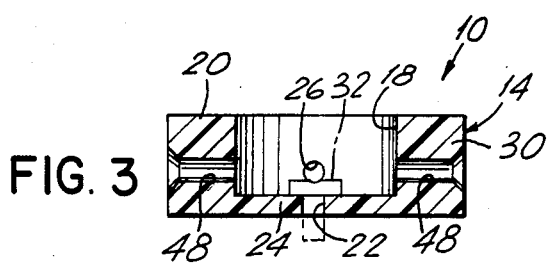
FIG. 3
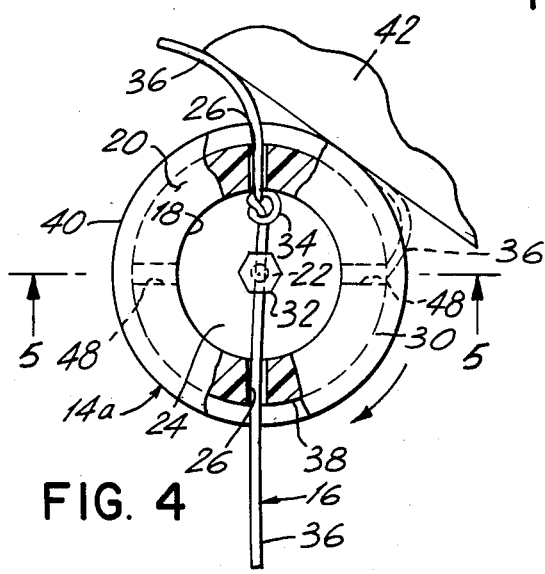
FIG. 4
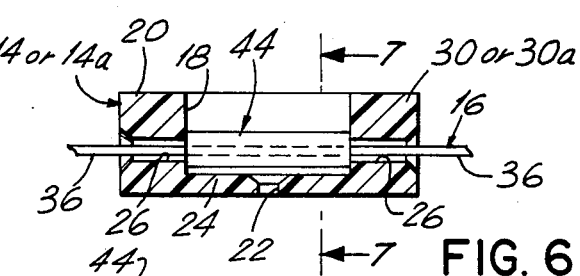
FIG. 6
FIG. 7
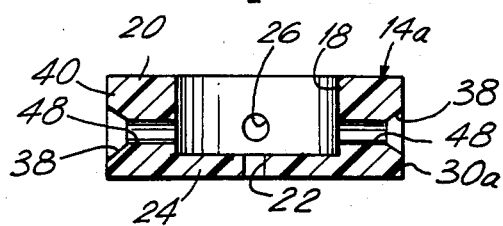
FIG. 5
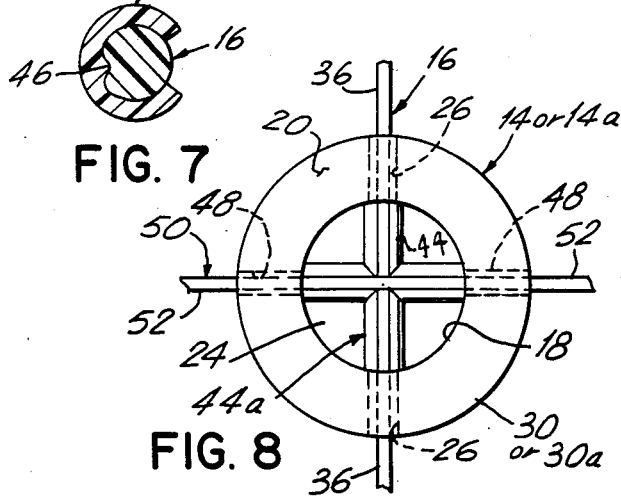
FIG. 8

CUTTING HEAD FOR LAWN TRIMMER

BACKGROUND OF THE INVENTION

The instant invention relates generally to lawn trimmers and more specifically it relates to a cutting head for lawn trimmers.

Automatic cord feed heads for lawn trimmers on the market, jam up with dirt and debris that causes them to malfunction after minimum use. This requires replacement parts or new head assemblies to be purchased by the consumer to keep the lawn trimmer functioning correctly. Thus field operations are brought to a hault due to the lawn trimmer head not feeding the cord properly.

Manufactures today usually make only one head assembly per lawn trimmer. If that head goes bad you have to buy a replacement of the same kind knowing that you have purchased a lawn trimmer that has no alternative available on the market, thus there is obsolenence built into it.

Sometimes the self feeding models feed too much cord out causing a balance problem and this excess cord is usually cut off as the flexible cord passes the blade of a cutting bar. If the unit does not have the cutting bar the excess cord creates a drag on the engine causing poor performance of the unit. Since time is a factor, the person doing a job is not likely to stop, manually trim the excess cord and then restart the engine to continue, every time too much cord is fed out by the self feeding model.

SUMMARY OF THE INVENTION

A principle object of the present invention is to provide a cutting head for a lawn trimmer which avoids the aforementioned problems of prior art head assemblies.

Another object is to provide a cutting head for a lawn trimmer that has no secondary movable parts except the flexible cord which will wear or break during normal use.

An additional object is to provide a cutting head for a lawn trimmer that does not require tools to install and remove the flexible cord.

A further object is to provide a cutting head for a lawn trimmer that is economical in cost to manufacture.

A still further object is to provide a cutting head for a lawn trimmer that is simple and easy to use.

Further objects of the invention will appear as the description proceeds.

To the accomplishment of the above and related objects, this invention may be embodied in the form illustrated in the accompanying drawings, attention being called to the fact, however that the drawings are illustrative only, and that changes may be made in the specific construction illustrated and described within the scope of the appended claims.

BRIEF DESCRIPTION OF THE DRAWING FIGURES

FIG. 1 is a side view of the invention attached to a lawn trimmer shown in phantom.

FIG. 2 is an enlarged bottom view of the invention with parts broken away.

FIG. 3 is a cross sectional view taken along line 3—3 in FIG. 2.

FIG. 4 is an enlarged bottom view of a first modification with parts broken away showing the housing block of the cutting head having a V-shaped track.

FIG. 5 is a cross sectional view taken along line 5—5 in FIG. 4.

FIG. 6 is a second modification of a cross sectional view similar to FIG. 5 having a C-shaped sleeve with wavy inner surface for gripping the flexible cord.

FIG. 7 is an enlarged cross sectional view taken along line 7—7 in FIG. 6 showing the C-shaped sleeve in greater detail.

FIG. 8 is a bottom view of a third modification showing an "X" configuration to the C-shaped sleeve therein.

DETAILED DESCRIPTION OF THE PREFERRED EMBODIMENTS

Turning now descriptively to the drawings, in which similar reference characters denote similar elements throughout the several views, FIG. 1 illustrates a cutting head 10 for a lawn trimmer 12 shown in phantom. The cutting head contains a cylindrical housing block 14 and a flexible cord 16.

As best seen in FIGS. 2 and 3 are housing block 14 has an opening 18 extending upwardly from underside 20, a central aperture 22 at top 24 of the housing block 14 extending into the opening 18 and a pair of opposed holes 26 at side 30 of the housing block 14 extending into the opening 18. The housing block 14 is bolted via bolt 32 upwardly through the opening 18 and the central aperture 22 to lower portion 34 of the lawn trimmer 12 so that the housing block is rotatably mounted thereto.

A knot 34 is manually formed at center of the cord 16. The knot 34 is placed within the opening 18 of the housing block 14 with ends 36 of the cord 16 extending outwardly through each of the opposed holes 26 at the side 30 of the housing block. When the trimmer 12 is turned on centrifugal force will force knot 34 tightly against one of the holes 26 on inside of housing block 14, depending on which direction engine of unit is turning. This causes cord 16 to be longer on one end than the other at first, but as soon as cutting takes place the longer of the two ends of cord 16 begins to wear down until both ends 36, extending from block 14 are in balance with knot 34 to one side of block 14 as in FIG. 2.

FIGS. 4 and 5 show a modified cylindrical housing block 14a that has a V-shaped annular groove 38 on exterior 40 of the side 30a to allow each end 36 of the flexible cord to 16 to recess within the V-shaped annular groove 38 when the cord 16 comes in contact with a solid object 42, such as a curb.

FIGS. 6 and 7 show a sleeve 44 being C-shaped with a wavy inner surface 46 in cross section for gripping and being secured to the flexible cord 16. The sleeve 44 is of equal length with diameter of the opening 18 in the housing block 14 or 14a whereby the sleeve 44 will resist centrifugal force and keep the cord 16 centered and within the opening 18 of the housing block with the ends 36 of the cord 16 extending outwardly symmetrically.

The cylinderical housing block 14 or 14a can have a second pair of opposed holes 48 located one hundred and eighty degrees from the first pair of opposed holes 26 at side of the housing block extending into the opening 18 so that a second cord 50 can be used in conjunction with the first cord 16.

As shown in FIG. 8 a sleeve 44, 44a is provided in a cross configuration being or equal length and width with diameter of the opening 18 the housing block 14 or 14a. The cross configuration sleeve of sleeve 44, 44a will keep the two cords 16 and 50 centered within the opening of the housing block with the ends 36 and 52 of the cords 16 and 50 extending outwardly symmetrically.

The housing blocks 14 and 14a, the flexible cords 16 and 50 and the sleeves 44 and 44a are fabricated out of strong lightweight unbreakable durable material such as nylon or the like.

While certain novel features of this invention have been shown and described and are pointed out in the annexed claims, it will be understood that various omissions, substitutions and changes in the forms and details of the device illustrated and in its operation can be made by those skilled in the art without departing from the spirit of the invention.

What is claimed is:

1. A cutting head for a lawn trimmer which comprises:
   (a) a cylindrical housing block having an opening extending upwardly from underside, a central aperture at top of said housing block extending into said opening and a pair of opposed holes at side of said housing block extending into said opening, said housing block is bolted upwardly through said opening and said central aperture to lower portion of said lawn trimmer so that said housing block is rotatably mounted thereto;
   (b) a flexible cord with a knot manually formed at center of said cord, said knot is placed within said opening of said housing block with ends of said cord extending outwardly through each of said opposed holes at said side of said housing block so that when said lawn trimmer is in operation the cord will be retained in said block against one of said holes, wherein said cylindrical housing block further having a V-shaped annular groove on exterior of said side to allow each said end of said flexible cord to recess within said V-shaped annular groove when said cord comes in contact with a solid object, further comprising a sleeve being C-shaped with a wavy inner surface in cross section for gripping and being retained on said flexible cord, said sleeve being of equal length with diameter of said opening in said housing block so that said sleeve will keep said cord centered within said housing block with said ends of said cord extending outwardly symmetrically.

2. A cutting head as recited in claim 1, further comprising:
   (a) said cylindrical housing block having a second pair of opposed holes located one hundred and eight degrees from said first pair of opposed holes at side of said housing block extending into said opening;
   (b) said sleeve being in a cross configuration being of equal length and width with diameter of said opening in said housing block so that said cross configuration sleeve will keep two said cords centered within housing block with said ends of said cords extending outwardly symmetrically.

* * * * *